C. HANSEL.
TIME CONTROLLED PROTECTIVE SYSTEM FOR RAILWAYS.
APPLICATION FILED MAY 6, 1908. RENEWED SEPT. 10, 1915.
1,161,663.
Patented Nov. 23, 1915.
2 SHEETS—SHEET 1.
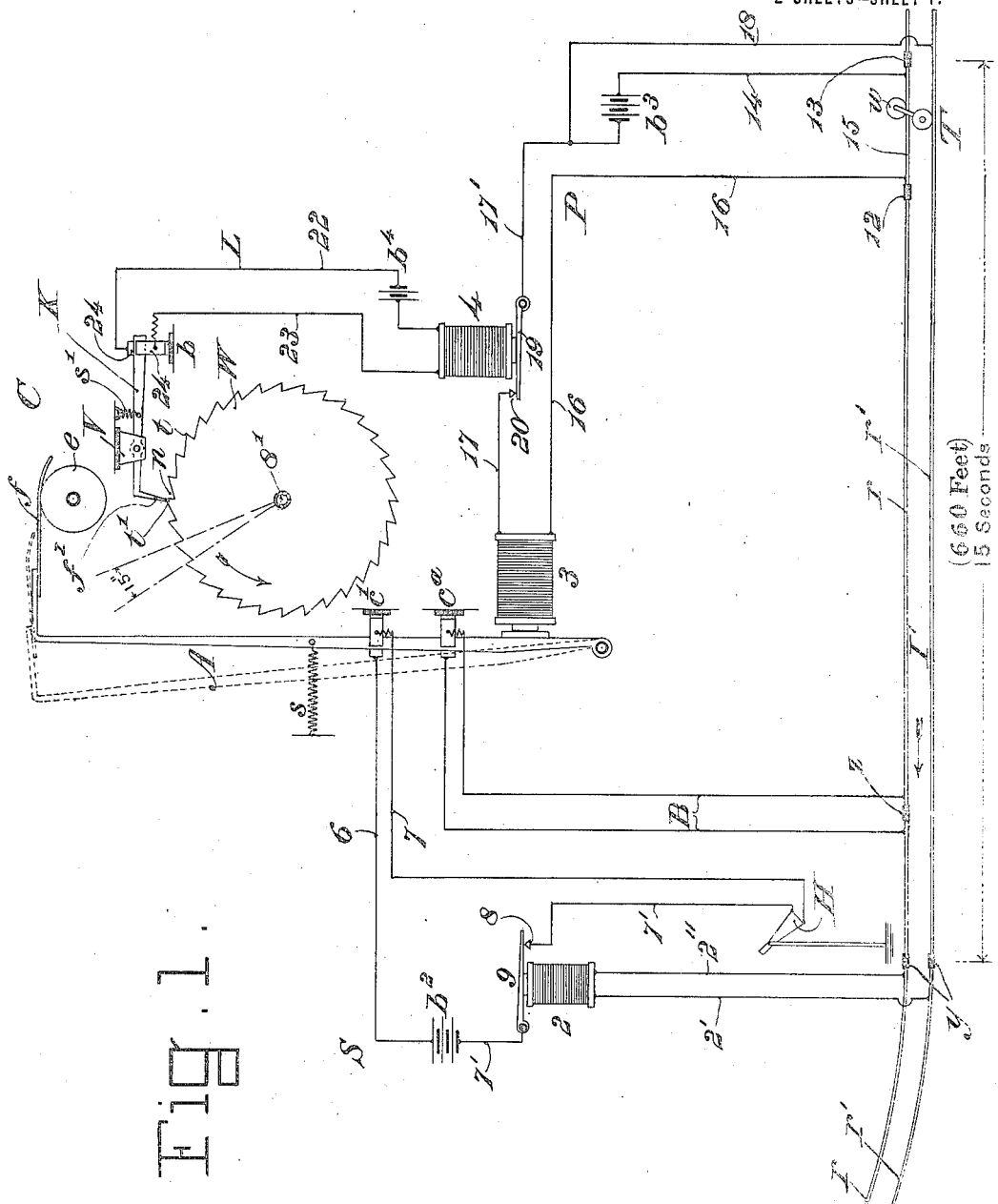

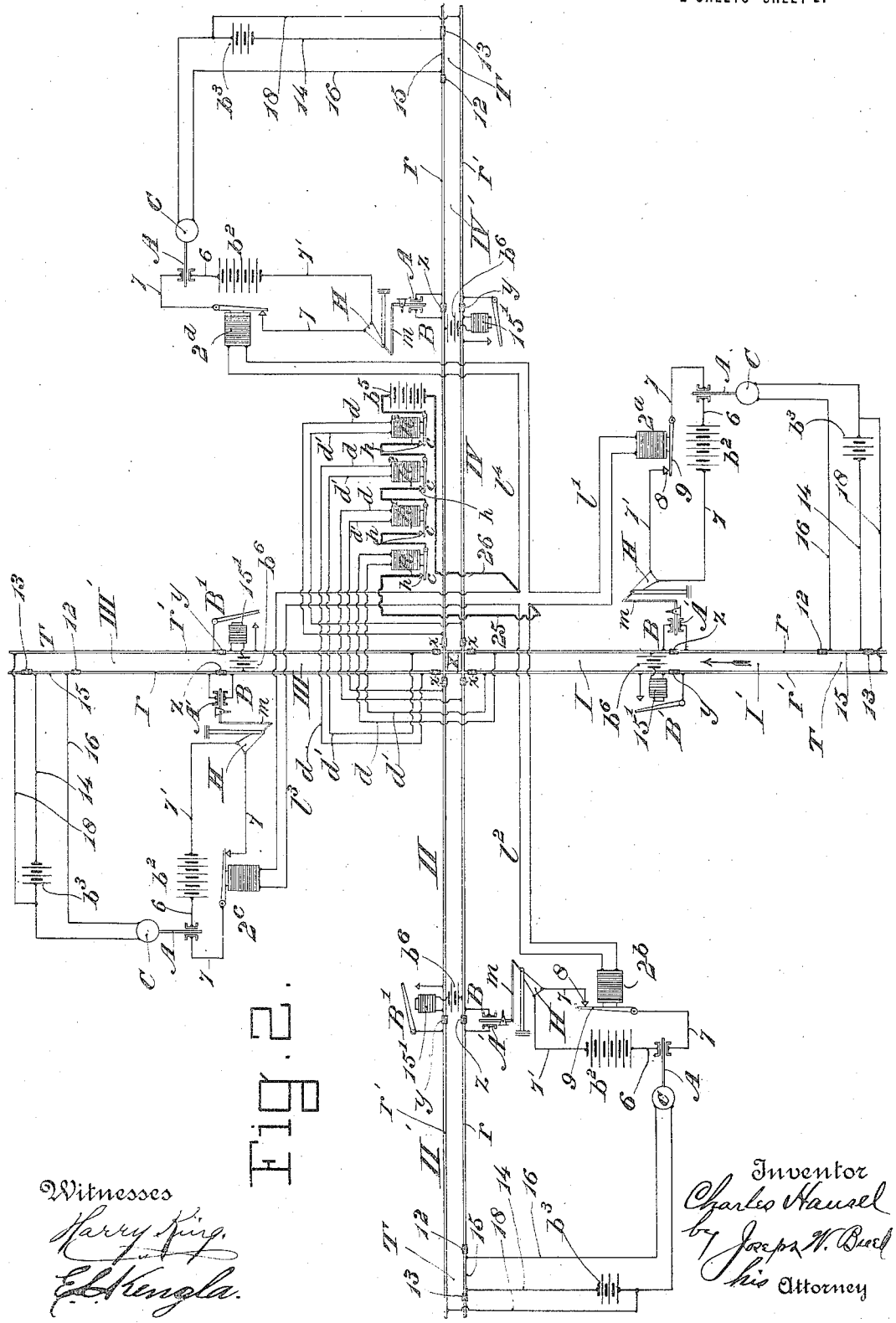

UNITED STATES PATENT OFFICE.

CHARLES HANSEL, OF CRANFORD, NEW JERSEY.

TIME-CONTROLLED PROTECTIVE SYSTEM FOR RAILWAYS.

1,161,663.     Specification of Letters Patent.     Patented Nov. 23, 1915.

Application filed May 6, 1908, Serial No. 431,276. Renewed September 10, 1915. Serial No. 50,110.

*To all whom it may concern:*

Be it known that I, CHARLES HANSEL, a citizen of the United States, residing at Cranford, in the county of Union and State of New Jersey, have invented certain new and useful Improvements in Time-Controlled Protective Systems for Railways, of which the following is a specification.

The usual method of operating railroads is by the so-called "block signal system," in which the track is divided into predetermined space intervals or blocks, having suitable signals at the entrance of each block, and so governed as to allow one train only to be admitted to a block at a time. It is obvious, however, that at curves, grade-crossings, and other dangerous points, along a line of way, that according to the plan of present wayside signaling systems, there is provided no means for revealing automatically speed regulating signals, or is there provided means for automatically controlling or limiting the speed of trains approaching such points based upon a time interval plan, and therefore many accidents have occurred because of excessive speed at such points.

According to the plan of this invention the signal at any predetermined point along a line of way may not only be automatically controlled to reveal the state or condition of the line in advance of said signal but the means employed is designed to give it the characteristic of a speed regulation signal, where it is considered necessary to reduce the speed of trains approaching a given signal point, in that the signal may be automatically set to "danger" or "stop" position by an approaching train when it reaches a signal transmitting point, and whereby it may be held in said danger position a predetermined length of time, corresponding to the interval of time within which an approaching train should be required to traverse a measured course intervening between said signal transmitting point and the signal approached.

The ordinary method of protecting a grade-crossing by signaling is to install a manual or power plant, with an interlocking machine in a signal cabin at the crossing, which interlocking machine is manipulated by a signal operator, thereby necessitating the constant presence of an operator, with the attendant labor cost.

According to the plan of this invention the tracks on each side of a cross-over or grade-crossing are divided into equal length block sections, and are so equipped as to provide in connection therewith means for automatically establishing reciprocal or mutually exchanged intercommunication between said blocks, in a manner whereby a danger condition arising in any one of the blocks will be simultaneously indicated by a "stop" signal at the entrance of each of the respective blocks.

It is further a characteristic feature of this invention to provide for the union with such a system, of a means for controlling the signals presiding respectively over the said blocks in a manner to automatically display individually said signals for the purpose of regulating the speed of trains approaching any one of said blocks.

Many accidents have been caused by enginemen overrunning signals properly displayed.

It is a further object of the present invention to provide in conjunction with such a plan of signal operation as above set forth, a supplementary system involving track apparatus for effecting cab-signaling and train-control, in a manner to be hereinafter pointed out.

As is well known in the art, electrically actuated cab-signal and train-controlled systems have generally to provide some form of contact between the circuits carried by the locomotive and those on the track, and in systems depending upon the presence of wheels on the traffic-rails there is ordinarily provided a locomotive-carried circuit that terminates in connection with two wheels insulated from each other and bearing upon a common running-rail, in order to complete said circuit. In such a system the train carried circuit is arranged to control a signal and train-control mechanism by reason of the absence or diminution of current due to the interruption of the train-carried circuit upon the passage of the equipped locomotive over a point of insulation to be found between successive rails on one side of the track, at signal-receiving and traffic-controlling points. Such points of insulation are normally bridged by an electrical conductor or loop to preserve the electrical continuity of the rails at such points under safety conditions, and which includes means for breaking such loops under danger conditions. For the purpose of a proper understanding of the present invention, however, it will be deemed unnecessary to show and describe the circuits and accessories required in a locomotive equipment, and therefore simply the track apparatus required for co-operation with the locomotive equipment, will be shown, described and claimed in the present application.

Those features and objects of my invention which have not been particularly and separately mentioned in the foregoing preamble will clearly appear in the light of the following more detailed description of the invention, which I have illustrated in the annexed drawings.

Referring to the drawings Figure 1 shows in diagram a plan view of a single track, together with the circuits and instruments arranged in connection therewith, that are employed for speed regulation control. Fig. 2 is a plan view of a grade-crossing formed by a railroad track crossing a second railroad track, and showing the electric connections of the track in diagrammatic manner.

Like characters indicate corresponding parts in both figures.

In the embodiment of my invention diagrammed in Fig. 1 the home signal H is shown as located in proximity to the adjacent rear end of a block I, that extends to form a curve, and that includes a rear track-relay 2, connected to the rails $r$, $r'$ by conductors $2'$, $2''$. The signal circuit controlled by relay 2 includes a battery $b^2$ connected to the usual signal operating mechanism, and said circuit may be traced as follows: from the plus pole of battery $b^2$ through conductors 6, bifurcated contact members $c'$, conductor 7, clutch magnet (not shown), conductor $7'$, contact 8, interposed armature 9 and conductor $7'$ back to the negative pole of the battery $b^2$. $I'$ designates an auxiliary or approaching section which comprises a measured course that extends from the signal H back to the signal transmitting point T. The measured course in practice extends 660 feet and serves in conjunction with the time-movement mechanism employed to provide a suitable space interval within which the speed of an approaching train can be determined and regulated. Arranged in operative and controlling relation with the signal-circuit S, is the lever armature A, of the relay 3, which latter is in turn controlled by the primary controlling circuit P, that is initially actuated by the wheels $w$ of a train passing the signal transmitting point. The said signal transmitting point T is located between the insulated joints 12 and 13, which latter are shown installed in spaced relation in the upper running rail $r$. The insulated short rail 15 extends between said joints 12 and 13 and is arranged to form a part of the primary control circuit. The primary control circuit is further made up of conductor 14 that leads from the battery $b^3$ to the short rail length 15 which latter is connected to relay 3 by wire 16. The return connection from relay 3 to the negative pole of battery is through wire 17, supply contact 20, armature 19 and wire $17'$. The primary circuit is also provided with a shunt connection that extends by wire 18 from conductor $17'$ to and in connection with the lower rail $r'$.

It will be perceived from the foregoing described arrangement that the relay magnet 3 will be normally energized to attract its armature A, to close the signal circuit but that when the low resistance of a parallel circuit formed by the wheels and axle $w$ of a locomotive, at the moment of their traverse over the rails at the signal transmitting point T there will be caused a shunting of the battery $b^3$ and the consequent de-energization of the magnet. The deënergization of the magnet 3 and the release of armature A serve primarily to break the signal circuit, but said armature A has an added function which will be presently pointed out.

In order to hold the signal circuit S open a sufficient length of time to assure the setting of the semaphore and to obtain a prolonged break in the signal circuit for the purpose of this invention, after its initial interruption by the means just described; there is provided a time governed switch mechanism and controlled circuit means for establishing a second break in said primary circuit. The means employed for that purpose consists of an electro-magnet 4 having its armature 19 and front contact 20 which are interposed to connect the conductors 17 and $17'$ of the primary controlling circuit P. The magnet 4 is included in a local or secondary circuit L, comprising a battery $b^4$, conductors 22 and 23 that terminate in bifurcated members 24, which in turn are normally joined by the coöperating end of a knife-switch K, that is governed in its movement by an intermediate clock mechanism, which in turn is brought into operation and stopped automatically by the armature lever A.

C designates a chronometer or clock mechanism comprising a train of mechanism which is actuated in any suitable manner, as by a spring (not shown). The type of clock preferably employed is one having a marine escapement. The escapement or detent wheel $e$ is adapted to be normally held from movement by the starting and stopping detent finger $f$ carried by the armature lever A. The detent finger $f$ is preferably made yielding and extends horizontally in a plane that is coincident with the upper periphery of detent wheel $e$ when brought into frictional engagement therewith for the purpose of obstructing the movement of the driving members of the clock, when the armature lever is held attracted by the magnet. Thus it will be observed that the armature lever A when it is held by the magnet 3 performs the two-fold function of holding the signal circuit closed and obstructing the movement of the clock mechanism under normal conditions, and, vice versa, of breaking the signal circuit and simultaneously liberating the driving members of the clock movement under actuating conditions.

The device for regulating the time movement of the switch lever K will now be described, and comprises a toothed wheel W mounted for rotation (in the direction of arrow) on the eight-minute shaft 8' of the clock mechanism. This time governed wheel W may be provided with any style of teeth $t$ that are adapted to co-act with the engaging end of the switch lever. The drawing shows, however, the periphery of said wheel provided with thirty-two teeth, to provide that the time interval required for moving each tooth past a fixed point will take precisely fifteen seconds. The time controlled switch lever K is shown as being pivoted to the frame work V, and is adapted to play up and down in a vertical plane. The inner free end of the switch lever is provided with a scarfed end that is bent downwardly to form a pendant finger or pallet $f'$, that engages successively the teeth formed on the periphery of the wheel W while the opposite free extremity of the switch lever is shaped to form a knife-switch engaging portion that is adapted to engage the bifurcated contact members 24 to close the secondary circuit L. A spring $s'$ is attached to the lever, as shown, and exerts a tension to forcibly hold the finger $f'$ in engagement with the tooth $t'$ of the wheel W. Normally the finger rests upon the extreme point of the tooth $t'$. Upon the release of the wheel $e$ by the retraction of the armature lever A upon the deënergization of the magnet 3 (under the influence of the spring $s$) the wheel W is caused to turn, and during its partial revolution allows the finger $f'$ to drop into the bottom of the notch $n$ under the influence of the spring $s'$, thus lifting the forward end of the switch-lever K away from the bifurcated contact members 24 and thereby opening the secondary or local circuit, L. The secondary circuit interruption produces a deënergization of the magnet 4, which thereupon drops its armature 19, opening the primary circuit at contact 20. The duration of the break in the respective circuits P and L thus caused, it will be seen is dependent upon the time governed movement of the switch-lever K which is governed in its movement by the travel of finger up the inclined plane of the tooth $t'$. The foregoing described operation represents according to the illustrated embodiment precisely fifteen seconds. The closing of the secondary circuit L will be immediately followed by the closure of the primary circuit P, thereby reënergizing magnet 3 and re-attracting the armature lever A to automatically close the signal circuit S and stop the clock. The armature A also serves to control the loop B around insulated joint $z$, forming a traffic-controlling point for cab-signaling and train-stopping devices, which means will be hereinafter more fully described in connection with the apparatus shown in Fig. 2.

Turning now to that branch of the system protecting a grade-crossing, illustrated in Fig. 2, there is shown the traffic rails of one track crossing the rails of a second track. These tracks on each side of the cross-over X are shown as being divided into equal-length sections or blocks I, II, III, IV, that are defined in their limits by oppositely disposed insulated joints $x$—$x$ and $y$—$z$. Each of these sections is equipped to provide elements or units of track-circuit control, by the employment of a connected battery $b^6$ at the entrance end, and a track-relay R connected by conductors $d$ and $d'$ at the advance end of the block. Each block is governed at its entrance by a home signal H located in proximity to the adjacent joints $y$—$z$; and that is controlled by a signal circuit S that embraces (in block I) the battery $b^2$, conductors 6 and 7, interposed armature 9 and front contact 8 of a magnet $2^a$, conductor $7'$, clutch magnet (not shown) and conductor $7'$; and said circuit is primarily controlled by the armature or circuit-controller 9 of magnet $2^a$.

The means for establishing connection and control between the magnets $2^a$, $2^b$, $2^c$, $2^d$ and the track relay R, R', R², R³ at the advance end of the blocks over which they preside will now be described. The magnets $2^a$, $2^b$, $2^c$, $2^d$ located in proximity to and operative relation with the respective signal circuits S are included in a common metallic circuit extending in four oppositely extending limbs $l'$, $l^2$, $l^3$, $l^4$ to the respective magnets $2^a, 2^b, 2^c, 2^d$, said limbs being united at $j$. The track relays R, R', R², R³ of each section are arranged and associated to form a series of switch controlling magnets, any one of which may be made to control the simultaneous actuation of the signal controlling magnets. To this end the armatures or circuit controller $c$ of the respective magnets are interposed serially in a circuit in such a manner that when all of said magnets are active or energized, they will maintain the circuit closed through supply contacts $h$, but which in the event of the deënergization of any one of said magnets by reason of a danger condition on the block over which it presides, there will be caused an opening of the controlling circuit. The circuit thus controlled includes the battery $b^5$ and main conductors 25 and 26 that are connected across the limb junctions at $j$ in a manner whereby the limbs $l'$, $l^2$, $l^3$, $l^4$ constitute parallel circuits, in each of which the magnets therein are arranged in series with respect to each other.

From the foregoing description it will be noted that when anyone of the sections is occupied or is in a dangerous condition, the signals guarding the other blocks will be simultaneously set at danger.

Arranged in combination with the signal circuits protecting the respective blocks I, II, III, IV, are shown means for providing the speed regulation signal feature hereinbefore particularly described with reference to Fig. 1, the approaching sections thereof being designated I', II', III', IV'. In addition to the speed regulation signal control effected by the means shown, the sections are shown as being provided with traffic-controlling points $z$. The installation in section I will be first described, and consists primarily of a loop or bridge-wire B connecting the respective ends of the two adjacent rails separated by insulating joint $z$. As this part or element of the system is intended to coöperate with the operative devices carried by a locomotive traveling in the direction of the arrow, I provide a switch A' for making and breaking the loop connection, which switch is operatively connected to the rod $m$ connected with and controlled by the semaphore or signal arm H.

The drawing shows the signal and switch respectively in a closed position but as soon as the signal arm is raised to a danger position by reason of either the operation of the time switch C or relay $2^a$ the loop around the joint $z$ will be opened and will remain in that condition to affect the apparatus of a passing locomotive, until said signal is cleared.

In section III there is shown means provided for automatically bridging the joint $y$ when a train is traveling out of section I into section III, so as to prevent the setting of the cab-signal and train-control devices against itself. To this end there is shown a loop B' connecting the ends of rails adjacent to and separated by insulated joint $y$. Within the loop wire B' is interposed the armature and contact of a clearing-loop relay 15'. Relay 15' is shown as being included in battery connection $b^6$ with rail $r'$ and is wound to a low resistance, being so adjusted as to normally have a non-effect on its armature when included in series with the track-relay.

In the normal condition of the track-circuit in section III, as shown in Fig. 2, the current from the battery $b^6$ flows through relay 15', rail $r$ of the track, thence through conductor $d$ to track-relay $R^2$, and in return to battery through wire $d'$ and rail $r'$. The relay is normally energized to hold its armature or circuit-controller $c$ against contact $h$ to close the main controlling circuit. When, however, a train passes into section III from section I it shunts out track-relay $R^2$, causing it to function to produce the required signals, while at the same time it short-circuits battery $b^6$ through the relay 15' and rails $r$ and $r'$ thereby increasing the current strength thereof to cause an attraction of its armature and the closure of the loop B'.

The foregoing described apparatus is shown as included in connection with the equipment of sections I, II, II and IV.

The operation of the foregoing described system will be apparent.

Although I have illustrated but two particular systems in which my broad invention may be embodied, it must be understood that the same may be embodied also in various other structures and arrangements of coöperating elements and combinations of circuits, all within the principles and scope of my invention.

What I claim as my invention, and desire to secure by Letters Patent, is:—

1. In a block signaling system, the combination of a rail track circuit, a signal circuit for operating and controlling a signal governed by said track circuit, another circuit controlling said signal circuit and in connection with the rails so as to be controlled by a passing train, and time controlled means for governing the closure of said last mentioned controller circuit, said means being itself under control of said last controller circuit.

2. In a block signaling system, the combination of a rail track circuit, a signal circuit for operating and controlling a signal governed by said track circuit, another circuit controlling said signal circuit and in connection with the rails so as to be controlled by a passing train, and a time-switch mechanism actuated by said controller circuit for automatically closing said controller circuit after a predetermined length of time.

3. In a block signaling system, the combination of a track-circuit, a signal located at the entrance end of said track circuit and at the end of an approaching measured course or section, a normally closed circuit for operating and controlling the said signal governed thereby, a controller circuit for governing said signal circuit that extends to connect with an insulated rail portion of the track, located at the beginning of said measured course, means for short-circuiting said controller circuit by a passing train at the beginning of said measured course, a time switch mechanism adapted to be set in operation upon the short-circuiting of said controller circuit, and that is designed to restore said circuit to its normal condition after a predetermined length of time.

4. In a signaling system for railways, the combination of a pair of tracks crossing each other and divided into cross-over track-circuit blocks, having a signal at the entrance of each block, and means controlled by the track circuits of any one of said blocks for simultaneously controlling the signals protecting respectively the cross-over blocks, additional means arranged in operative relation to said signals for controlling the same, whereby a signal may be produced by an approaching train before it reaches the block presided over by said signal, and time controlled means controlling said additional means for clearing said signal before the train reaches said block provided the speed of the train has been reduced to a predetermined rate.

5. In a block signaling system the combination of a signal circuit for operating and controlling a signal, another circuit controlling said signal circuit and in connection with the rails so as to be controlled by a passing train, and that includes a governing magnet, having its armature arranged in operative relation to said signal circuit, a clock mechanism controlled by said armature and means controlled by said clock mechanism for automatically closing said controlling circuit within a predetermined interval of time after said circuit has been actuated by a passing train.

6. In a block signaling system the combination of a signal circuit, an insulated rail section included in one of the running rails of the track, a primary controlling circuit arranged to govern said signal circuit, which primary circuit extends therefrom to a distance to connect with the insulated rail section, a governing magnet included in said primary circuit having its armature arranged in controlling relation to said signal circuit, a magnet, a circuit controlling armature and a contact interposed in said primary circuit and governed by said magnet, a secondary circuit including the last mentioned magnet, and a time switch for opening and closing the secondary circuit, and a clock mechanism controlled by the signal circuit controller armature for giving movement to said time switch.

7. In an automatic stop means, the combination with the rails of a track of a circuit controller connected therewith, a time controlled means, for placing in operative condition said circuit controller and restoring same after a predetermined length of time, and a circuit connected with the rails of the track for actuating said time controlled means by a passing train, whereby said circuit controller may be made inoperative before the train reaches the point of connection of said circuit controller, provided the speed of the train has been reduced to a predetermined rate of speed.

8. In a protective means of the character described, the combination with the rails of a track of a circuit controller connected therewith, means for controlling said circuit controller that comprises a time operated mechanism, and a track connected actuating means therefor arranged in operative relation with the tracks and in the rear of said circuit controller and which is made operative by the passage of a train, whereby said circuit controller may be made inoperative before the train reaches the point of connection of said circuit controller, provided the speed of the train has been reduced to a predetermined rate of speed.

In testimony whereof I affix my signature, in presence of two witnesses.

CHARLES HANSEL.

Witnesses:
 OSCAR C. KUNGE,
 ALBERT MINNOCK.